United States Patent
Inoue et al.

(10) Patent No.: US 11,426,688 B2
(45) Date of Patent: Aug. 30, 2022

(54) HONEYCOMB STRUCTURE AND METHOD FOR PRODUCING HONEYCOMB STRUCTURE

(71) Applicant: NGK INSULATORS, LTD., Nagoya (JP)

(72) Inventors: Jun Inoue, Nagoya (JP); Michio Suzuki, Nagoya (JP); Yoshitaka Tabuchi, Nagoya (JP); Keisuke Kimura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/822,507

(22) Filed: Mar. 18, 2020

(65) Prior Publication Data

US 2020/0306677 A1 Oct. 1, 2020

(30) Foreign Application Priority Data

Mar. 29, 2019 (JP) .............................. JP2019-069413

(51) Int. Cl.
*B01D 46/00* (2022.01)
*C04B 38/00* (2006.01)
*B01D 46/24* (2006.01)

(52) U.S. Cl.
CPC ..... *B01D 46/0001* (2013.01); *B01D 46/2459* (2013.01); *C04B 38/008* (2013.01); *C04B 2235/96* (2013.01)

(58) Field of Classification Search
None
See application file for complete search history.

(56) References Cited

U.S. PATENT DOCUMENTS

| 2001/0033910 | A1 | 10/2001 | Ikeshima |
| 2003/0053940 | A1* | 3/2003 | Harada ................ C04B 37/001 422/180 |
| 2006/0254713 | A1 | 11/2006 | Fujita et al. |
| 2006/0263573 | A1* | 11/2006 | Okumura .............. F01N 13/017 428/116 |
| 2009/0130378 | A1 | 5/2009 | Imaeda et al. |

(Continued)

FOREIGN PATENT DOCUMENTS

| JP | 2004-262670 A1 | 9/2004 |
| KR | 10-2013-0009497 A1 | 1/2013 |

OTHER PUBLICATIONS

German Office Action (Application No. 10 2020 001 817.3) dated Feb. 10, 2021 (with parital English translation).

(Continued)

*Primary Examiner* — Elizabeth Collister
(74) *Attorney, Agent, or Firm* — Burr & Brown, PLLC

(57) ABSTRACT

A honeycomb structure including a plurality of porous honeycomb block bodies bound via joining material layers A. Each of the porous honeycomb block bodies includes a plurality of porous honeycomb segments bound via joining material layers B, each of the porous honeycomb segment includes: partition walls that defines a plurality of cells to form flow paths for a fluid, each of cells extending from an inflow end face that is an end face on a fluid inflow side to an outflow end face that is an end face on a fluid outflow side; and an outer peripheral wall located at the outermost periphery. At least a part of the joining material layers A has higher toughness than that of the joining material layers B.

10 Claims, 11 Drawing Sheets

(56) References Cited

U.S. PATENT DOCUMENTS

| | | | |
|---|---|---|---|
| 2012/0207967 A1* | 8/2012 | Pyzik | C04B 37/005 |
| | | | 428/116 |
| 2018/0272328 A1* | 9/2018 | Yuki | B01D 46/0061 |
| 2019/0284101 A1* | 9/2019 | Yuki | B01J 37/0018 |
| 2019/0300448 A1* | 10/2019 | Ishioka | B01D 53/94 |

OTHER PUBLICATIONS

Chinese Office Action (with English translation), Chinese Application No. 202010237892.2, dated Jul. 5, 2021 (27 pages).

\* cited by examiner

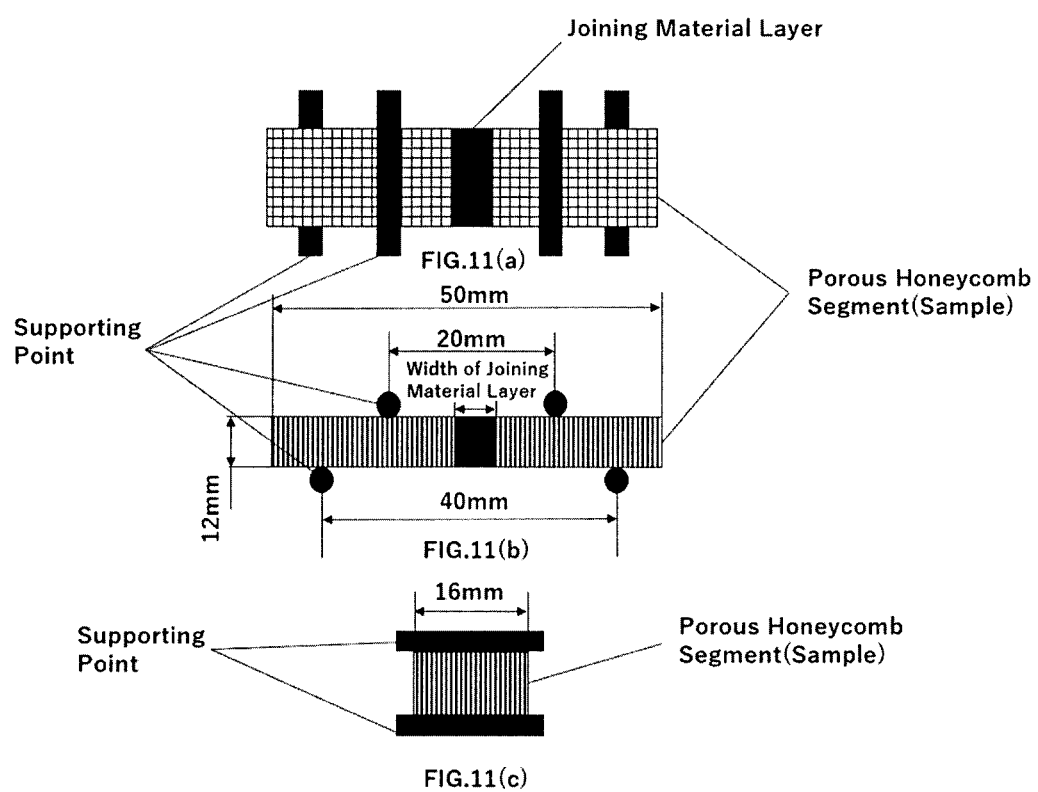

HONEYCOMB STRUCTURE AND METHOD FOR PRODUCING HONEYCOMB STRUCTURE

TECHNICAL FIELD

The present invention relates to a honeycomb structure and a method for producing a honeycomb structure. More particularly, the present invention relates to a honeycomb structure having good thermal shock resistance and a method for producing the same.

BACKGROUND OF THE INVENTION

Conventionally, an internal combustion engine incorporates a diesel particulate filter (DPF) to collect fine particles contained in an exhaust gas from a diesel engine. Further, the internal combustion engine may incorporate a gasoline particulate filter (GPF) to collect fine particles contained in an exhaust gas from a gasoline engine. The DPF and GPF are formed by joining a plurality of porous honeycomb segments such as silicon carbide (SiC) through a joining material, and have a structure obtained by grinding an outer periphery of a segment joined body having the joined honeycomb segments to form a honeycomb structure having an appropriate shape such as a circle and an ellipse, and then coating the outer peripheral surface with a coating material.

Patent Document 1 discloses a method for producing a honeycomb structure by joining a plurality of porous honeycomb segments through a joining material to produce a segment joined body. In the method for producing the honeycomb structure as described in Patent Document 1, as shown in FIG. 1, a plurality of porous honeycomb segments 10 are stacked along an L-shaped receiving plate 30 via adhesive layers 20 to obtain a desirable stacked structure, and then applying a pressure onto the entire structure. This leads to production of a segment joined body (porous honeycomb block body 40) in which the porous honeycomb segments 10 are vertically and horizontally stacked.

CITATION LIST

Patent Literature

[Patent Literature 1] Japanese Patent Application Publication No. 2004-262670 A

SUMMARY OF THE INVENTION

In recent years, there has been an increasing demand for a filter for collecting particulates such as DPFs and GPFs to increase their sizes in the field of heavy machinery and the like. Therefore, a large-sized honeycomb structure is produced by further stacking a plurality of the porous honeycomb block bodies 40 as shown in FIG. 1 via joining material layers.

However, as the size of the honeycomb structure increases, a temperature difference between the inside and the outside of the honeycomb structure increases. Such a temperature difference between the inside and the outside of the honeycomb structure creates uneven thermal expansion in the honeycomb structure, causing problems that thermal shock resistance is decreased and cracks are easily generated in the honeycomb structure.

An object of the present invention is to provide a honeycomb structure having good thermal shock resistance and a method for producing the same.

As a result of intensive studies, the present inventors have focused on the fact that when a plurality of honeycomb block bodies which are joined bodies of honeycomb segments are stacked via joining material layers to form a large honeycomb structure which is used as a filter, cracks are easily generated at joined portions between the honeycomb bloc bodies near the joining material layers. Then, the present inventors have found that the problems can be solved by providing the joining material layers for joining the honeycomb block bodies to each other with a function of reducing thermal shock. Thus, the present invention is specified as follows:

1

A honeycomb structure comprising a plurality of porous honeycomb block bodies bound via joining material layers A, wherein each of the porous honeycomb block bodies comprises a plurality of porous honeycomb segments bound via joining material layers B, each of the porous honeycomb segment comprising: partition walls that defines a plurality of cells to form flow paths for a fluid, each of cells extending from an inflow end face that is an end face on a fluid inflow side to an outflow end face that is an end face on a fluid outflow side; and an outer peripheral wall located at the outermost periphery, and wherein at least a part of the joining material layers A has higher toughness than that of the joining material layers B.

2

A honeycomb structure comprising a plurality of porous honeycomb block bodies bound via joining material layers A, wherein each of the porous honeycomb block bodies comprises a plurality of porous honeycomb segments bound via joining material layers B, each of the porous honeycomb segment comprising: partition walls that defines a plurality of cells to form flow paths for a fluid, each of cells extending from an inflow end face that is an end face on a fluid inflow side to an outflow end face that is an end face on a fluid outflow side; and an outer peripheral wall located at the outermost periphery, and wherein the joining material layers A are formed of the same material as that of the joining material layers B, and the joining material layers A comprises joining material layers with at least a part of them being lacked.

3

A method for producing a honeycomb structure, the method comprising the steps of: binding a plurality of porous honeycomb segments via joining material layers B to form porous honeycomb block bodies, each of the porous honeycomb segment comprising: partition walls that defines a plurality of cells to form flow paths for a fluid, each of cells extending from an inflow end face that is an end face on a fluid inflow side to an outflow end face that is an end face on a fluid outflow side; and an outer peripheral wall located at the outermost periphery; and binding the porous honeycomb block bodies via joining material layers A to produce a honeycomb structure, wherein at least a part of the joining material layers A has higher toughness than that of the joining material layers B.

4

A method for producing a honeycomb structure, the method comprising the steps of: binding a plurality of porous honeycomb segments via joining material layers B to form porous honeycomb block bodies, each of the porous honeycomb segment comprising: partition walls that defines a plurality of cells to form flow paths for a fluid, each of cells extending from an inflow end face that is an end face on a fluid inflow side to an outflow end face that is an end face on a fluid outflow side; and an outer peripheral wall located at the outermost periphery; and binding the porous honeycomb block bodies via joining material layers A to produce a honeycomb structure, wherein the joining material layers A are formed of the same material as that of the joining material layers B, and the joining material layers A comprise joining material layers with at least a part of them being lacked.

According to the present invention, it is possible to provide a honeycomb structure having good thermal shock resistance and a method for producing the same.

BRIEF DESCRIPTION OF THE DRAWINGS

FIG. 11 is a schematic view showing a state where "toughness" is measured in accordance with a four-point bending strength test method of JIS R1601 2008 "Bending Strength Test Method for Fine Ceramics at Room Temperature". FIG. 11(a) is a schematic plan view as seen from a top of a porous honeycomb segment (sample) disposed in a test jig. FIG. 11(b) is a schematic plan view as seen from a side surface of the sample set on the test jig. FIG. 11(c) is a schematic plan view as seen from an end face of the sample set on the test jig.

DETAILED DESCRIPTION OF THE INVENTION

Hereinafter, embodiments of a honeycomb structure and a method for producing the same according to the present invention will be specifically described with reference to the drawings. It is to understand that the present invention is not limited to the following embodiments, and various design modifications and improvements may be made based on ordinary knowledge of a person skilled in the art, without departing from the scope of the present invention.

Embodiment 1

Structure of Honeycomb Structure 114

Figure 2:
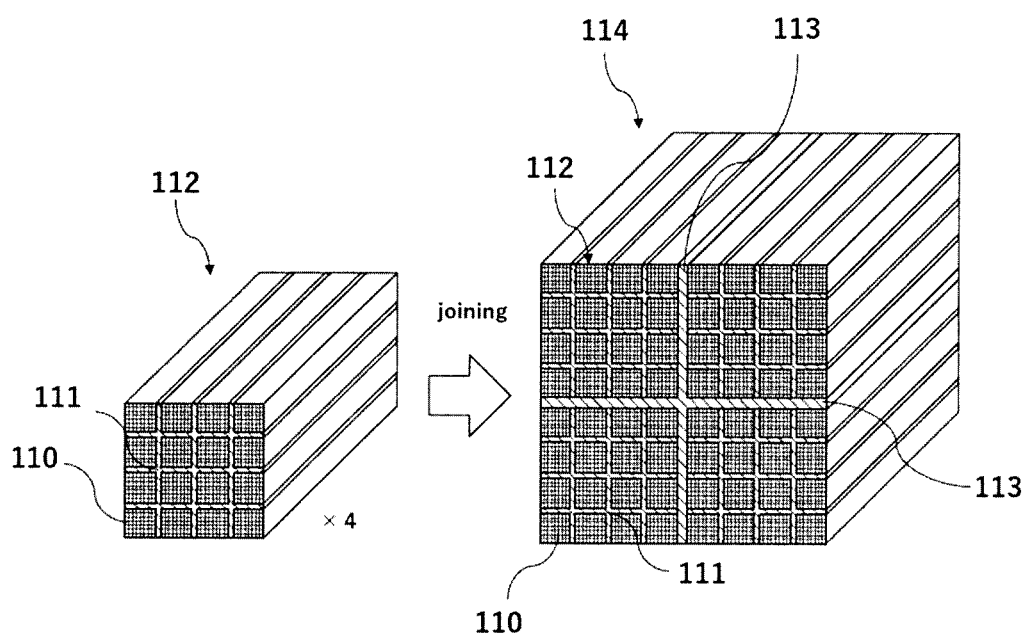
FIG. 2 is a schematic external view of a porous honeycomb block and a honeycomb structure according to Embodiment 1 of the present invention.

FIG. 2 is a schematic external view of each of a porous honeycomb block body 112 and a honeycomb structure 114 according to Embodiment 1 of the present invention. The honeycomb structure 114 is formed by binding a plurality of porous honeycomb block bodies 112 via joining material layers A (113). The porous honeycomb block body 112 is formed by binding a plurality of porous honeycomb segments 110 via joining material layers B (111). FIG. 2 shows an embodiment where a total of four porous honeycomb block bodies 112 are bound by vertically and horizontally stacking two porous honeycomb block bodies 112, respectively, to join them, although not limited to thereto. For example, three or more porous honeycomb block bodies 112 may be vertically and horizontally stacked to join them, and a different number of porous honeycomb block bodies may be vertically and horizontally stacked, respectively, to join them, rather than the same number. Thus, the honeycomb structure 114 having a desired size can be appropriately produced using the porous honeycomb block bodies 112.

Figure 3:
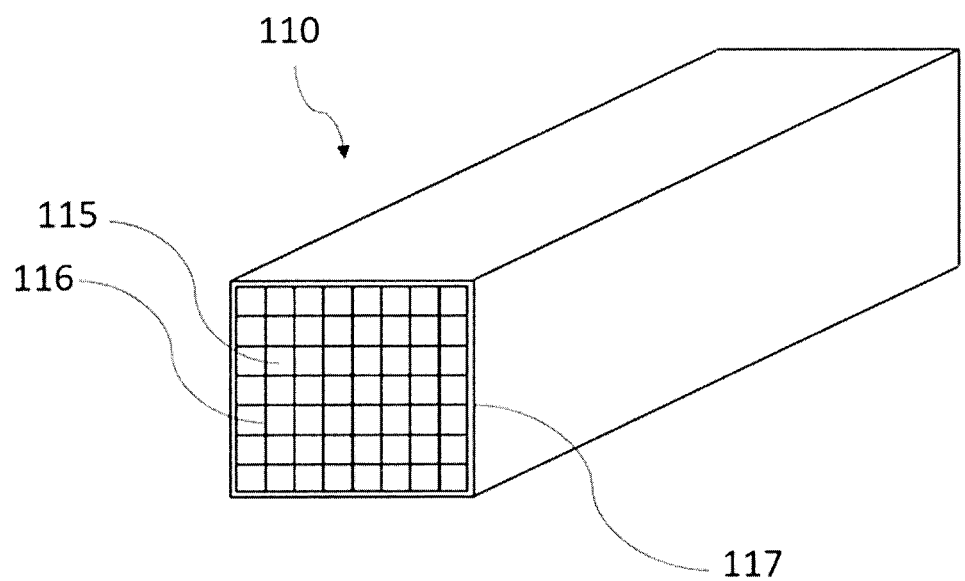
FIG. 3 is a schematic external view of a porous honeycomb segment according to Embodiment 1 of the present invention.

As shown in FIG. 3, the porous honeycomb segment 110 includes: partition walls 116 defining a plurality of cells 115 to form flow paths for a fluid, which extends from an inflow end face that is an end face on a fluid inflow side to an outflow end face that is an end face on a fluid outflow side; and an outer peripheral wall 117 located at the outermost periphery. The partition walls 116 and the outer peripheral wall 117 are preferably formed of porous bodies made of SiC (silicon carbide), although not limited thereto. They may be formed of cordierite, mullite, alumina, aluminum titanate, silicon nitride, and cordierite-silicon carbide composite material, lithium aluminum silicate, metallic silicon, or a mixture thereof.

Figure 4A:
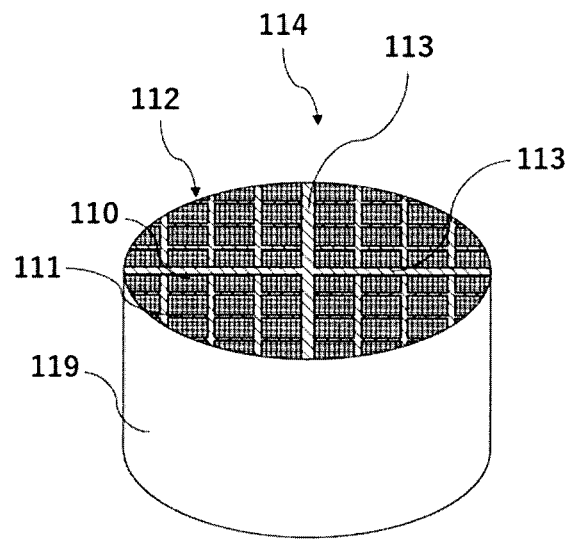
FIG. 4(a) is a schematic external view of a honeycomb structure according to Embodiment 1 of the present invention in which an outer periphery is formed into a circular shape by grinding the outer periphery, and an outer peripheral surface is coated with a coating material.
Figure 4B:
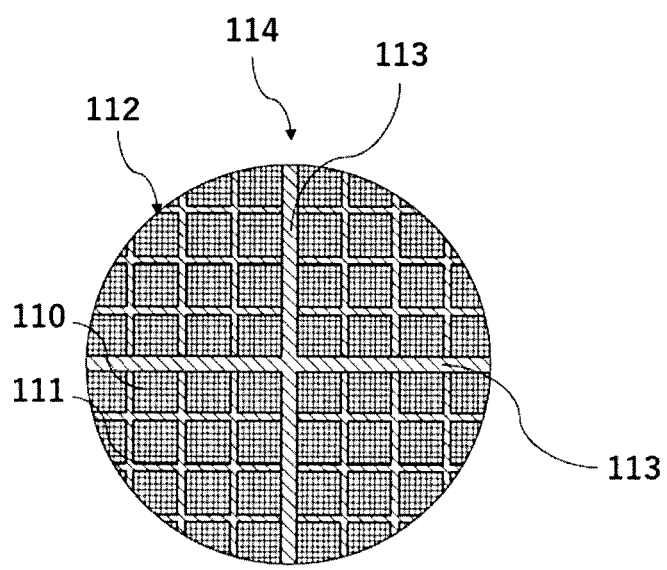
FIG. 4(b) is a cross-sectional view of a honeycomb structure according to Embodiment 1 of the present invention, which is perpendicular to a direction extending from an inflow end face to an outflow end face, in which an outer periphery is formed into a circular shape by grinding the outer periphery, and an outer peripheral surface is coated with a coating material.

The honeycomb structure 114 according to Embodiment 1 of the present invention has a structure having plugged portions for purifying fine particles (carbon fine particles and the like) in an exhaust gas, so that it can be used as a fine particle collection filter such as a diesel engine particulate filter (DPF) and an gasoline engine particulate filter (GPF). FIG. 4(a) shows a schematic external view of the honeycomb structure 114 in a state where the outer periphery is formed into a circular shape by grinding the outer periphery, and the outer peripheral surface is coated with a coating material 119. FIG. 4(b) shows a cross-sectional view of the honeycomb structure 114 perpendicular to a direction extending from the inflow end face to the outflow end face, in a state where the outer periphery is formed into a circular shape by grinding the outer periphery, and the outer peripheral surface is coated with the coating material 119.

At least a part of the joining material layers A (113) for binding the plurality of porous honeycomb block bodies 112 has higher toughness than that of the joining material layers B (111) for binding the plurality of porous honeycomb segments 110. As used herein, the "toughness" means a tenacity/toughness of a material, and is represented by the following equation (1):

$$\text{Toughness} = \text{Permissible Bending Strain} = \text{Deformation Volume at Breakage} - \text{Deformation Volume at Breakage Starting Point} \quad (1)$$

The toughness can be measured in accordance with the four-point bending strength test method of JIS R1601 2008 "Test Method for Bending Strength of Fine Ceramics at Room Temperature". FIG. 11 is a schematic view showing a state where the "toughness" is measured in accordance with the four-point bending strength test method. FIG. 11(a) is a schematic plan view as seen from the top of the porous honeycomb segment (sample) joined by the joining material layers, which is disposed in a test jig. FIG. 11(b) is a schematic plan view as seen from the side of the sample. FIG. 11(c) is a schematic plan view as seen from the end face of the sample set on the test jig.

As shown in FIG. 11, the sample has a rectangular pillar-shaped cross section, and the sample is set on the test jig such that the cell extending direction is the thickness direction. The sample has a thickness of 12 mm, a full length of 50 mm, and a width of 16 mm. The sample is prepared so that the joining layer can be arranged at the center in the full length direction.

A distance between the test jig for disposing the sample and supporting points is in accordance with a test jig name: 4p-40/20, bending method: four point bending method, a distance between external supporting points: 40±0.1 mm, a distance between internal supporting points: 20±0.1 mm, as described in Table 1—Bending Method, Sample, Test Jig and Distance between Supporting points of JIS R1601 2008.

The toughness of the joining material layer is measured by attaching a load cell on a crosshead and disposing it on the test jig, measuring a load and displacement during the four-point bending strength test as stated above to obtain a stress-strain curve (SS curve). In the above equation (1), "at Breakage" refers to a point at which the stress becomes zero in the stress-strain curve, and the "Breakage Starting Point" refers to a yield point in the stress-strain curve.

The lager honeycomb structure 114 leads to an increase in a temperature difference between the inside and the outside of the honeycomb structure 114, whereby a thermal expansion in the honeycomb structure 114 may become uneven. For such a problem, in the honeycomb structure 114 according to Embodiment 1 of the present invention, at least a part of the joining material layers A (113) for joining the plurality of porous honeycomb block bodies 112 has higher toughness than that of the joining material layers B (111) for joining the plurality of porous honeycomb segments 110, so that a thermal shock caused by uneven thermal expansion between the plurality of porous honeycomb block bodies 112 can be reduced. That is, even if a difference in thermal expansion occurs between the plurality of porous honeycomb block bodies 112, the joining material layers A (113) that join the porous honeycomb block bodies 112 absorb the difference in thermal expansion due to its higher toughness, so that the thermal shock generated between the plurality of porous honeycomb block bodies 112 can be reduced, and cracking generated at the relevant sites can be satisfactorily suppressed.

In the joining material layers A (113) for joining the plurality of porous honeycomb block bodies 112, a portion having higher toughness than that of the joining material layers B (111) for joining the plurality of porous honeycomb segments 110 can reduce the thermal shock generated between the plurality of porous honeycomb block bodies 112, even if that portion is a part of the joining material layers A as described above. In particular, it is preferable to provide the joining material layers A (113) having higher toughness than that of the joining material layers B (111) to a portion where cracks are easily generated by thermal shock. For example, in a cross section perpendicular to the extending direction of the cells 115 of the honeycomb structure 114 in which the plurality of porous honeycomb block bodies 112 are vertically and horizontally stacked and joined, a cross portion located at the vertical center and the horizontal center where cracks tend to occur is preferably the joining material layer A (113) having higher toughness than that of the joining material layers B (111). FIGS. 2 and 4 show the honeycomb structure 114 in which the joining material layer A (113) is located at such a cross portion.

Further, all of the joining material layers A (113) for joining the plurality of porous honeycomb block bodies 112 preferably have higher toughness than that of the joining material layers B (111) for joining the plurality of porous honeycomb segments 110. Such a structure results in provision of the joining material layers A (113) having higher toughness at all of the joined portions of the plurality of porous honeycomb block bodies 112, which would otherwise tend to generate cracks, so that impact resistance is improved.

In the honeycomb structure 114 according to Embodiment of the present invention, the joining material layers A (113) for joining the plurality of porous honeycomb block bodies 112 are made of the same material as that of the joining material layers B (111) for joining the plurality of porous honeycomb segments 110, and are formed of the joining material layers having a higher width than that of the joining material layers B (111), as shown in FIG. 2 and FIG. 4. With such a structure, the joining material layers A (113) that join the plurality of porous honeycomb block bodies 112 has higher toughness than that of the joining material layers B (111).

The width of each joining material layer A (113) for joining the plurality of porous honeycomb block bodies 112 may be larger than that of each joining material layer B (111) for joining the plurality of porous honeycomb segments 110, although not particularly limited thereto. The width of each joining material layer A (113) may be different from that of each joining material layer B (111). The widths of the joining material layers A (113) and the joining material layers B (111) may be set as needed, depending on the size of the honeycomb structure 114, the materials of the joining material layers A (113) and joining material layers B (111), or desired thermal shock resistance. For example, the width of each joining material layer A (113) for joining the plurality of porous honeycomb block bodies 112 may be a varying width in a range of 0.5 to 2.0 times the width of each joining material layer B (111) for joining the plurality of porous honeycomb segments 110.

The width of each joining material layer is a value as determined by measuring a width of the joining material layer connecting the centers of one sides of the segment end face by means of a loupe with scale or image processing measurement, for the joining material layer that can be confirmed from the end face after the porous honeycomb segments 110 are joined to each other. A value obtained by averaging the widths of all the joining material layers of the porous honeycomb block body 112 is defined as the width of the joining material layer B (111), whereas the width of the joining material layer of the joining material layer A (113) may be a varying width in a range of from 0.5 to 2.0 times.

The joining material layers B (111) and the joining material layers A (113) are not particularly limited as long as they can join the surfaces of the outer peripheral walls 117 to each other with good adhesive strength. The joining materials forming the joining material layers B (111) and the joining material layers A (113) may contain, for example, inorganic particles, and inorganic fibers and colloidal oxides as other components. Further, during the joining of the porous honeycomb segments 110 and the joining of the plurality of the porous honeycomb block bodies 112, in addition to those components, an organic binder such as methylcellulose and carboxymethylcellulose, a dispersant, water and the like may be optionally added, and mixed and kneaded using a kneader such as a mixer to form a paste, which may be used as a joining material.

Examples of materials for forming the inorganic particles contained in the joining materials forming the joining material layers B (111) and the joining material layers A (113) include ceramics selected from the group consisting of silicon carbide, silicon nitride, cordierite, alumina, mullite, zirconia, zirconium phosphate, aluminum titanate, titania, and combinations thereof; Fe—Cr—Al-based metals; nickel-based metals; silicon-silicon carbide-based composite materials; and the like.

Examples of the inorganic fibers contained in the joining materials forming the joining material layers B (111) and the joining material layers A (113) include ceramic fibers such as aluminosilicate and silicon carbide, and metal fibers such as copper and iron. Suitable colloidal oxides include silica sol, alumina sol and the like. The colloidal oxides are suitable for providing a suitable adhesive force to the joining material, and can also be bonded to the inorganic fibers and the inorganic particles by drying and degreasing them to provide a strong joining material having improved heat resistance after drying.

It is preferable that the plurality of the porous honeycomb block bodies 112 include the same number of porous honeycomb segments 110 as each other. Such a structure results in the plurality of porous honeycomb block bodies 112 having the same size, so that the widths of the joining material layers A (113) for joining the plurality of porous honeycomb block bodies 112 can be uniformly provided as a whole, thereby providing good thermal shock resistance. Further, since the porous honeycomb block bodies 112 having the same size may be produced, the production efficiency is improved.

In the honeycomb structure 114, the plurality of porous honeycomb block bodies 112 are formed by binding the same number of the porous honeycomb block bodies 112 in the vertical and horizontal directions. According to such a structure, when the outer periphery is ground and formed into a circular shape, the portion to be ground and removed is reduced, and the production efficiency is improved, as shown in FIG. 4.

For the honeycomb structure 114, a catalyst may be further provided on surfaces or inner side of the partition walls 116 that define the plurality of cells 115. A type of the catalyst is not particularly limited, and it can be appropriately selected according to the use purpose and application of the honeycomb structure 114. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst (LNT catalyst) containing an alkaline earth metal and platinum as storage components for nitrogen oxides ($NO_x$). Illustrative examples of a catalyst that does not use the noble metal include a NOx selective catalytic reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure 114.

Method for Producing Honeycomb Structure 114

An example of a method for producing the honeycomb structure 114 according to Embodiment 1 of the present invention will be now described.

First, the porous honeycomb segments 110 as illustrated in FIG. 3 are produced. As the production step of the porous honeycomb segments 110, first, a binder, a dispersant (surfactant), a pore former, water, and the like are added to a ceramic raw material made of a SiC material, and these are mixed and kneaded to prepare a green body. Here, the SiC material means a material mainly based on SiC (silicon carbide), including, for example, a material consisting only of SiC such as recrystallized SiC, Si—SiC based composite materials, cordierite-SiC based composite materials, metal silicon-impregnated SiC, and the like.

The prepared green body is then formed into a honeycomb shape by an extrusion molding method to obtain a raw (unfired) pillar shaped honeycomb formed body. The pillar shaped honeycomb formed body extruded from an extruder is cut into an appropriate length. The extrusion molding method can be carried out using an apparatus such as a ram type extruder and a bi-axial screw type continuous extruder. For forming the honeycomb shape, a method using a die having a desired cell shape, partition wall thickness, and cell density is preferable. Thus, the porous honeycomb segment 110 which is the unfired honeycomb formed body is produced.

An outer shape of each porous honeycomb segment 110 is not particularly limited, and it may be a pillar shape with rectangular end faces as in the present embodiment, or a pillar shape with circular end faces (circular pillar shape), or a pillar shape with polygonal (triangular, pentagonal, hexagonal, heptagonal, octagonal, etc.) end faces, except for rectangular end faces.

The porous honeycomb segments 110 are then dried. The drying may be carried out by dielectric drying using high-frequency energy generated by passing a current through the porous honeycomb segments 110, or may be carried out by hot air drying which introduces hot air into the porous honeycomb segments 110. Further, natural drying left at room temperature, microwave drying using a microwave, freeze drying, or the like may be carried out, or a combination of a plurality of drying methods may be carried out. Subsequently, the porous honeycomb segments 110 are fired. In this case, the plugged portions are provided by sintering a plugging material on both end faces of the porous honeycomb segment 110 so as to form segments, in order to purify fine particles (carbon fine particles and the like) in an exhaust gas. The plugged portion is provided at each cell 115 on both end faces of the porous honeycomb segment 110. No plugged portion is provided on the other end face of the cell 115 having the plugged portion provided on one end face. On the other hand, the plugged portion is provided on the other end face of the cell 115 where the plugged portion is not provided on one end face. Such plugged portions can provide a filter function.

The fired porous honeycomb segment 110 is then ground along four sides of the outer peripheral wall 117, optionally using a grinding jig, such that the outer shape of the porous honeycomb segment 110 has a predetermined shape. By grinding and removing the outer peripheral wall 117, for example, the outer shapes can be made uniform among the plurality of porous honeycomb segments 110.

Figure 1:
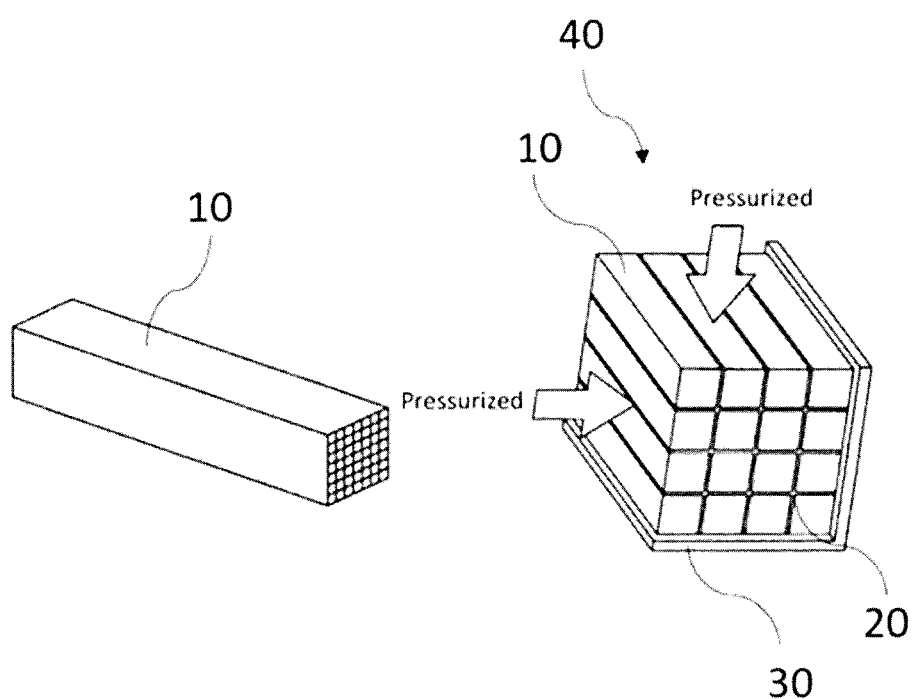
FIG. 1 is a schematic view showing a conventional honeycomb segment and a manner of producing a segment joined body by joining the honeycomb segments.

The joining material is then applied to each of the plurality of porous honeycomb segments 110 between the joining surfaces to join them via the joining material layers B (111). In the joining step, a plurality of porous honeycomb segments 110 may be stacked along an L-shaped receiving plate via the joining material layers B (111) using the method shown in FIG. 1 to form a desired stacked structure, and then applying a pressure to the entire structure to join them. Thus, the porous honeycomb block body 112 in which the plurality of porous honeycomb segments 110 are bound as shown in FIG. 2 is produced.

The joining material is then applied to each of the plurality of porous honeycomb block bodies 112 between the joining surfaces to join them via the joining material layers A (113). In the joining step, the plurality of porous honeycomb block bodies 112 may be stacked along an L-shaped receiving plate via the joining material layers A (113) using the method shown in FIG. 1 to form a desired stacked structure, and then applying a pressure to the entire structure to join them. Thus, the porous honeycomb structure 114 in which the plurality of porous honeycomb block bodies 112 are bound as shown in FIG. 2 is produced. In this case, the honeycomb structure 114 is formed such that at least a part of the joining material layers A (113) has higher toughness than that of the joining material layers B. In Embodiment 1 of the present invention, as shown in FIG. 2 and FIG. 4, the joining material layers A (113) for joining the plurality of porous honeycomb block bodies 112 are formed to have a different width from that of the joining material layers B (111) for joining the plurality of porous honeycomb segments 110, thereby providing the higher toughness than that of the joining material layers B (111). In Embodiment 1 of the present invention, for example, the joining material layers A (113) may be made of a different material from that of the joining material layers B (111), without or with a change of the width of the joining material layers B (111), thereby providing the joining material layers having higher toughness than that of the joining material layers B (111).

For the honeycomb structure 114 thus produced, the outer periphery may be ground and formed into an appropriate shape such as a circle or an ellipse, and the outer periphery may be coated with a coating material.

Figure 5:
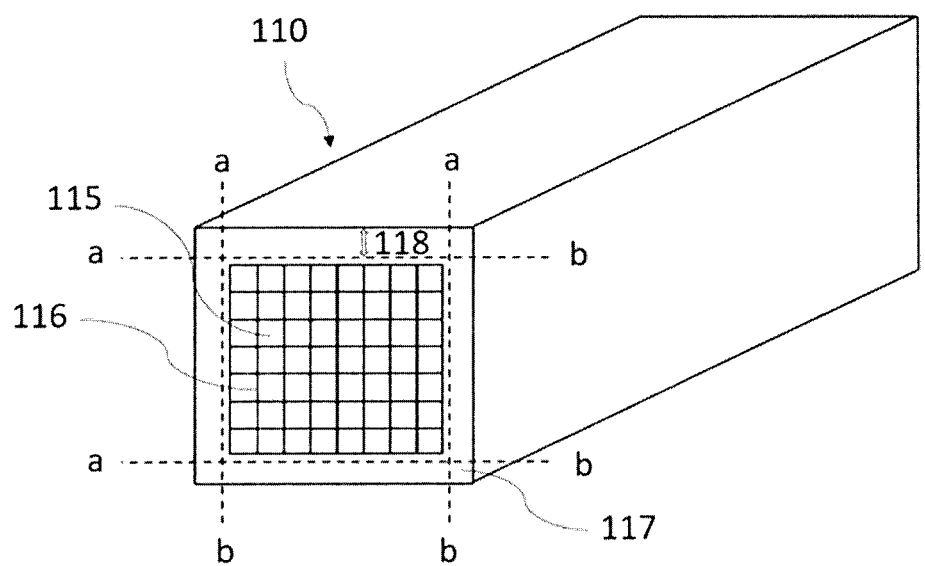
FIG. 5 is a schematic external view of a porous honeycomb segment according to Embodiment 1 of the present invention, in which an outer peripheral wall is formed to be thicker by a grinding margin.
Figure 6:
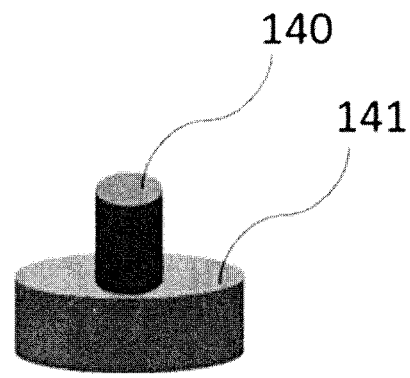
FIG. 6 is a schematic external view of a grinding jig in which a disk-shaped grindstone is provided at a tip of a rotation axis.

Further, in the step of producing the porous honeycomb block body 112, at least the outer peripheral wall 117 of the porous honeycomb segment 110 forming the outer peripheral wall of the porous honeycomb block body 112 may be formed to be thicker by a grinding margin 118. Further, the joining material may be applied to at least the outer peripheral wall 117 of the porous honeycomb segment 110 forming the outer peripheral wall of the porous honeycomb block body 112 and dried, so as to have a thickness thicker by the grinding margin 118. FIG. 5 is a schematic external view of the porous honeycomb segment 110 in which the outer peripheral wall 117 is formed to be thicker by the grinding margin 118. After the grinding margin 118 of the outer peripheral wall 117 of the porous honeycomb segment 110 forming the outer peripheral wall of the porous honeycomb block body 112 thus formed is ground and removed, a plurality of the porous honeycomb block bodies 112 may be bound via the joining material layers A (113) to form the honeycomb structure 114.

In the production step of the porous honeycomb segments 110, each porous honeycomb segment 110 having the grinding margin 118 in the outer peripheral wall 117 may be produced by adding a binder, a dispersant (surfactant), a pore former, water and the like to a ceramic raw material made of a SiC material, mixing and kneading them to prepare a green body, which is then molded by an extrusion molding method. The porous honeycomb segments 110 each having the outer peripheral wall 117 having the grinding margin 118 may be produced by such extrusion molding, or may be produced by preparing pillar shaped honeycomb formed bodies by extrusion molding, and then forming the outer peripheral wall 117 to be thicker by the grinding margin 18.

The porous honeycomb segments 110 each having the grinding margin 118 in the outer peripheral wall 117 are dried and fired, and the grinding margins 118 formed on each of four side surfaces of the outer peripheral wall 117 are ground and removed, for example along straight lines indicated by dotted lines a-b, as shown in FIG. 5. The grinding margin 118 is thus removed to produce the porous honeycomb segments 110 as shown in FIG. 3. Although FIG. 5 illustrates an example where the grinding margin 118 is formed on all four side surfaces of the outer peripheral wall 117 of the porous honeycomb segment 110, the present invention is not limited thereto, and the grinding margin 118 may be formed only on the side surface of a part of the outer peripheral wall 117 of the porous honeycomb segment 110, for example, only on the side surface of the outer peripheral wall 117 of the porous honeycomb segment 110 located at the outermost periphery when the porous honeycomb block body 112 is formed.

Figure 7:
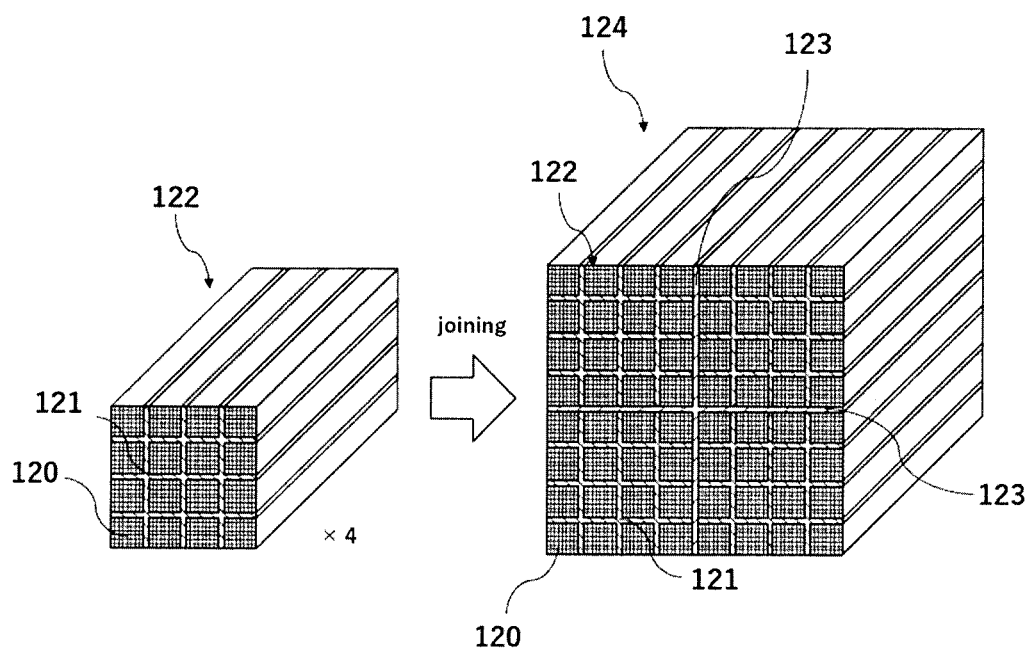
FIG. 7 is a schematic external view of a porous honeycomb block body and a honeycomb structure according to Embodiment 2 of the present invention.

The grinding margin 118 can be ground and removed using a grinding jig. For example, as shown in FIG. 7, a grinding jig having a structure in which a disk-shaped grindstone 141 is provided at a tip of a rotation axis 140 can be used. According to the grinding jig, the grinding margins 118 each formed on the four side surfaces of the outer peripheral wall 117 of the fired porous honeycomb segment 110 can be gradually ground and removed by bringing the grindstone 114 into contact with the grinding margins 118 while rotating the grindstone 141 at a high speed by a rotation drive from the rotation axis 140.

The grindstone 141 preferably has a count in a range of from #80 to #120. By carrying out the grinding of the outer peripheral wall 117 using the grindstone 141 having a count in a range of from #80 to #120, the surface roughness of the outer peripheral wall 117 after grinding and removing the grinding margin 118 is decreased, and leads to ease of uniform processing. Therefore, in the joining step of the plurality of porous honeycomb segments 110 as described later, the plurality of porous honeycomb segments 110 having smaller variations in the outer shapes can be joined.

When the grinding margin 118 of the outer peripheral wall 117 of the porous honeycomb segment 110 is ground and removed, it is preferable to further include a step of grinding and removing the grinding margin 118 of the outer peripheral wall 117 of a part of the porous honeycomb segment 110, and then rotating the porous honeycomb segment 110 in a direction parallel to a direction connecting the inflow end face to the outflow end face as a direction of the rotation axis to grind and remove the grinding margin of the outer peripheral wall 117 of the other part of the porous honeycomb segment 110. More particularly, the grinding margin 118 is preferably ground and removed by fixing porous honeycomb segment 110 such that the segment side surface parallel to the direction connecting the inflow end face to the outflow end face is parallel to a plane portion of the rotating grindstone, and bringing the grindstone 114 into contact with the porous honeycomb segment for only a fraction of the grinding margin 118. Further, the porous honeycomb segment 110 is preferably ground by rotating it at a specified angle. For example, if the porous honeycomb segment 110 is a rectangular parallelepiped segment, the grinding margin may be ground by rotating the porous honeycomb segment 110 at 90 degrees at the end of the grinding of an upper surface of the porous honeycomb segment 110 using a machining center for grinding the four sides, and placing the porous honeycomb segment 110 such that an unprocessed surface is the upper surface. With such a configuration, the movement of the grinding jig becomes efficient, for example when the length of the porous honeycomb segment 110 in the cell extending direction is longer, so that the grinding efficiency is improved.

A thickness of the grinding margin 118 of the porous honeycomb segment 110 after firing is preferably from 20 to 80% of the thickness of the outer peripheral wall 117 before the grinding margin 118 is ground and removed. If the thickness of the grinding margin 118 is less than 20% of the thickness of the outer peripheral wall 117 before the grinding margin 118 is ground and removed, the deformation volume of the segment outer shape generated during the firing cannot be absorbed, causing a problem that the outer shape of the segment cannot be uniform. Further, if the thickness of the grinding margin 118 is more than 80% of the thickness of the outer peripheral wall 117 before the grinding margin 118 is ground and removed and the grinding exceeds the thickness of the outer peripheral wall 117, a collecting portion of the filer may be ground to unify the interiors of the cells, causing a problem that a product function (filter performance) is reduced. The thickness of the grinding margin 118 of the porous honeycomb segment 110 after firing is more preferably from 30 to 70%, and even more preferably from 40 to 60% of the thickness of the outer peripheral wall 117 before the grinding margin 118 is ground and removed. Although the optimum value of the thickness of the grinding margin 118 varies depending on the structure of the porous honeycomb segment 110, a longer length in the cell extending direction tends to increase deformation of the shape during the firing. Therefore, it is preferable to increase the thickness of the grinding margin 118.

In the grinding of the grinding margin 118 of the porous honeycomb segment 110, it is preferable to perform the grinding so that the outer shape of the plurality of porous honeycomb segment 110 after grinding becomes uniform. The uniform outer shapes of the plurality of porous honeycomb segments 110 after grinding can lead to uniformness of the thicknesses of the joining layers when joining the porous honeycomb segments 110.

The plurality of porous honeycomb segments 110 from which the grinding margins 118 have been ground and removed can be then joined to form the porous honeycomb block body 112, as described above. Further, a plurality of the porous honeycomb block bodies 112 can be joined to form the honeycomb structure 114, as stated above.

In the joining step, since each porous honeycomb segment 110 has ground and removed the grinding margin 118, the outer walls 117 of the respective porous honeycomb segments 110 have uniform surface properties, so that a variation in the outer shapes of the honeycomb segments 110 are suppressed. Therefore, in the porous honeycomb block body 112 formed by joining the plurality of porous honeycomb segments 110, the variation in the widths of the joining material layers B (111) used for joining is suppressed, and generation of displacement of the adjacent porous honeycomb segments 110 arranged is suppressed. Therefore, the porous honeycomb block bodies 112 and the honeycomb structure 114 using the same have constant thermal stress transmission, and suppress a problem that the thermal shock resistance which is a characteristic of the particulate filter such as DPF or GPF is reduced. Further, a problem of having to be addressed by decreasing a production efficiency in order to improve the variation in the outer shapes of the honeycomb segments as in the prior arts is eliminated, so that the production efficiency of the honeycomb structure 114 is improved.

Embodiment 2

Structure of Honeycomb Structure 124

FIG. 7 is a schematic external view of each of a porous honeycomb block body 122 and a honeycomb structure 124 according to Embodiment 2 of the present invention. The honeycomb structure 124 is formed by binding a plurality of porous honeycomb block bodies 122 via joining material layers A (123). The porous honeycomb block body 122 is formed by binding a plurality of porous honeycomb segments 120 via joining material layers B (121). FIG. 7 shows an embodiment where a total of four porous honeycomb block bodies 122 are bound by vertically and horizontally stacking two porous honeycomb block bodies 122, respectively, to join them, although not limited to thereto. For example, three or more porous honeycomb block bodies 122 may be vertically and horizontally stacked, respectively, to join them, and a different number of porous honeycomb block bodies may be vertically and horizontally stacked to join them, rather than the same number. Thus, the honeycomb structure 124 having a desired size can be appropriately produced using the porous honeycomb block bodies 122.

As with the structure shown in Embodiment 1 using FIG. 3, the porous honeycomb segment 120 includes: partition walls defining a plurality of cells to form flow paths for a fluid, which extends from an inflow end face that is an end face on a fluid inflow side to an outflow end face that is an end face on a fluid outflow side; and an outer peripheral wall located at the outermost periphery. The partition walls and the outer peripheral wall are preferably formed of porous bodies made of SiC (silicon carbide), although not limited thereto. They may be formed of cordierite, mullite, alumina, aluminum titanate, silicon nitride, and cordierite-silicon carbide composite material, lithium aluminum silicate, metallic silicon, or a mixture thereof.

Figure 8A:
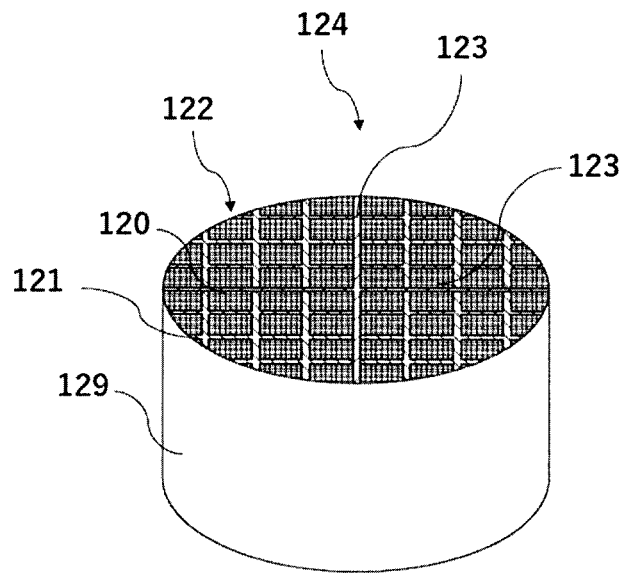
FIG. 8(a) is a schematic external view of a honeycomb structure according to Embodiment 2 of the present invention in which an outer periphery is formed into a circular shape by grinding the outer periphery and then coating an outer peripheral surface with a coating material.
Figure 8B:
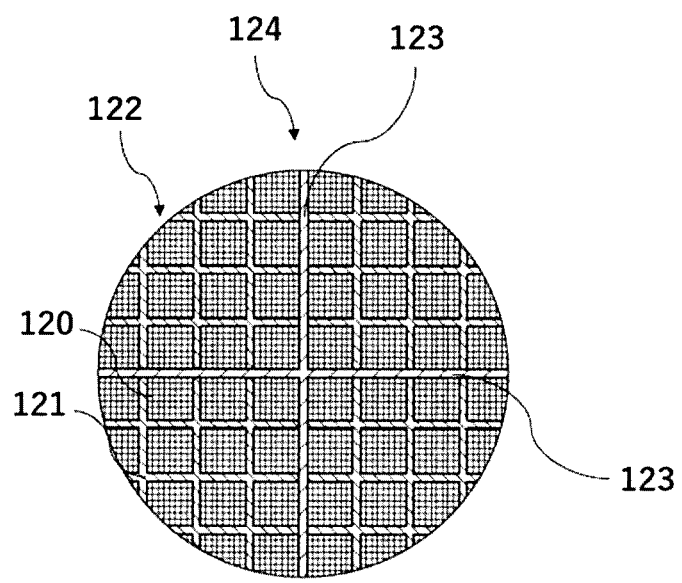
FIG. 8(b) is a cross-sectional view of a honeycomb structure according to Embodiment 2 of the present invention, which is perpendicular to a direction extending from an inflow end face to an outflow end face, in which an outer periphery is formed into a circular shape by grinding the outer periphery and then coating an outer peripheral surface with a coating material.

The honeycomb structure 124 according to Embodiment 2 of the present invention has a structure having plugged portions for purifying fine particles (carbon fine particles and the like) in an exhaust gas, so that it can be used as a fine particle collection filter such as a diesel engine particulate filter (DPF) and gasoline engine particulate filter (GPF). FIG. 8(a) shows a schematic external view of the honeycomb structure 124 in a state where the outer periphery is formed into a circular shape by grinding the outer periphery, and the outer peripheral surface is coated with a coating material 129. FIG. 8(b) shows a cross-sectional view of the honeycomb structure 124 perpendicular to a direction extending from the inflow end face to the outflow end face, in a state where the outer periphery is formed into a circular shape by grinding the outer periphery, and the outer peripheral surface is coated with the coating material 129.

At least a part of the joining material layers A (123) for joining the plurality of porous honeycomb block bodies 122 has higher toughness than that of the joining material layers B (121) for joining the plurality of porous honeycomb segments 120. Therefore, a thermal shock caused by uneven thermal expansion between the plurality of porous honeycomb block bodies 122 can be reduced. That is, even if a difference in thermal expansion occurs between the plurality of porous honeycomb block bodies 122, the joining material layers A (123) that join the porous honeycomb block bodies 122 absorb the difference in thermal expansion due to its higher toughness, so that the thermal shock generated between the plurality of porous honeycomb block bodies 122 can be reduced, and cracking generated at the relevant sites can be satisfactorily suppressed.

In the honeycomb structure 124 according to Embodiment 2 of the present invention, the joining material layers A (123) for joining the plurality of porous honeycomb block bodies 122 are made of a material having higher toughness than that of the joining material layers B (121) for joining the plurality of porous honeycomb segments 120.

The joining material layers B (111) are not particularly limited as long as they can join the surfaces of the outer peripheral walls of the porous honeycomb segments 120 to each other with good adhesive strength. The joining material forming the joining material layers B (121) may contain, for example, inorganic particles, and inorganic fibers and colloidal oxides as other components. Further, during the joining of the porous honeycomb segments 120, in addition to those components, an organic binder such as methylcellulose and carboxymethylcellulose, a dispersant, water and the like may be optionally added, and mixed and kneaded using a kneader such as a mixer to form a paste, which may be used as a joining material.

Examples of materials for forming the inorganic particles contained in the joining material forming the joining material layers B (121) include ceramics selected from the group consisting of silicon carbide, silicon nitride, cordierite, alumina, mullite, zirconia, zirconium phosphate, aluminum titanate, titania, and combinations thereof; Fe—Cr—Al-based metals; nickel-based metals; silicon-silicon carbide-based composite materials; and the like.

Examples of the inorganic fibers contained in the joining materials forming the joining material layers B (121) include ceramic fibers such as aluminosilicate and silicon carbide, and metal fibers such as copper and iron. Suitable colloidal oxides include silica sol, alumina sol and the like. The colloidal oxides are suitable for providing a suitable adhesive force to the joining material, and can also be bonded to the inorganic fibers and the inorganic particles by drying and degreasing them to provide a strong joining material having improved heat resistance after drying.

The joining material layers A (123) are not particularly limited as long as they are made of a material having higher toughness than that of the joining material layers B (121), and it allows the surfaces of the outer peripheral walls of the porous honeycomb block bodies 122 made of SiC material to be joined with good adhesive strength. Examples of the joining material forming the joining material layers B (121) that can be used include a joining material having higher density (amount) of alumina fibers than that of the joining material forming the joining material layers A (123). Further, a joining material having alumina fibers with varied lengths can be used. Furthermore, the joining material layers A (123) may be formed by changing a ratio of the respective components contained in the joining material forming the joining material layers A (123), or formed by adding a material other than the alumina fibers to increase the toughness or replacing the alumina fibers with that material.

In the honeycomb structure 124 according to Embodiment 2 of the present invention, a portion of the joining material layers A (123) made of the material having higher toughness than that of the joining material layers B (121) may be a part of the joining material layers A (123), but all of the joining material layers A (123) is preferably made of that material. Such a structure results in provision of the joining material layers A (123) having higher toughness at all of the joined portions of the plurality of porous honeycomb block bodies 122, which would otherwise tend to generate cracks, so that impact resistance is improved.

In the honeycomb structure 124 according to Embodiment 2 of the present invention, it is preferable that the plurality of the porous honeycomb block bodies 122 include the same number of porous honeycomb segments 120 as each other. Such a structure results in the plurality of porous honeycomb block bodies 122 having the same size, so that the widths of the joining material layers A (123) for joining the plurality of porous honeycomb block bodies 122 can be uniformly provided as a whole, thereby providing good thermal shock resistance. Further, since the porous honeycomb block bodies 122 having the same size may be produced, the production efficiency is improved.

In the honeycomb structure 124, the plurality of porous honeycomb block bodies 122 are formed by binding the same number of the porous honeycomb block bodies 122 in the vertical and horizontal directions. According to such a structure, when the outer periphery is ground and formed into a circular shape, the portion to be ground and removed is reduced, and the production efficiency is improved, as shown in FIG. 8.

As with the honeycomb structure 114 according to Embodiment 1, the honeycomb structure 124 according to Embodiment 2 may further include noble metal-based catalysts or catalysts other than these provided on the surfaces or inner sides of the partition walls that define a plurality of cells.

Method for Producing Honeycomb Structure 124

The method for producing the honeycomb structure 124 according to Embodiment 2 of the present invention can be carried out in the same manner as the method for producing the honeycomb structure 114 according to Embodiment 1. That is, first, the porous honeycomb segments 120 can be produced, and the joining material can be then applied to each of the plurality of porous honeycomb segments 120 between the joining surfaces to join them via the joining material layers B (121) to produce the porous honeycomb block body 122. The joining material can be then applied to each of a plurality of porous honeycomb block bodies 122 between the joining surfaces to join them via the joining material layer A (123) to produce the honeycomb structure 124 with the bound porous honeycomb block bodies 122 as shown in FIG. 7. In this case, at least a part of the joining material layers A (123) is formed to have higher toughness than that of the joining material layers B. In Embodiment 2 of the present invention, the joining material layers A (123) for joining the plurality of porous honeycomb block bodies 122 has higher toughness than that of the joining material layers B (121) for joining the plurality of porous honeycomb segments 120, thereby providing higher toughness than that of the joining material layers B (121).

For the honeycomb structure 124 thus produced, the outer periphery may be ground and formed into an appropriate shape such as a circle or an ellipse, and the outer periphery may be coated with a coating material.

Further, in the step of producing the porous honeycomb block bodies 122, as shown in the method for producing the honeycomb structure 114 according to Embodiment 1 of the present invention, at least the outer peripheral wall of the porous honeycomb segment 120 forming the outer peripheral wall of the porous honeycomb block body 122 may be ground to be thicker by a grinding margin, and the grinding margin may be removed before joining them. Further, at least the outer peripheral wall of the porous honeycomb segment 120 forming the outer peripheral wall of the porous honeycomb block body 122 may be coated with the joining material and dried to form it to be thicker by the grinding margin, and the grinding margin may be removed.

Embodiment 3

Structure of Honeycomb Structure 134

Figure 9:
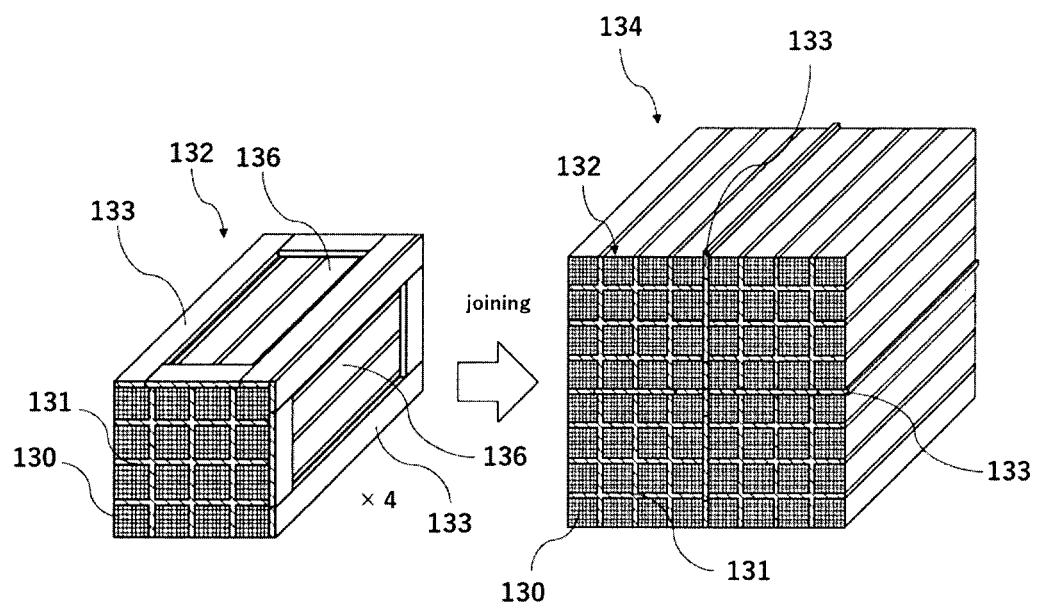
FIG. 9 is a schematic external view of a porous honeycomb block body and a honeycomb structure according to Embodiment 3 of the present invention.

FIG. 9 is a schematic external view of each of a porous honeycomb block body 132 and a honeycomb structure 134 according to Embodiment 3 of the present invention. The honeycomb structure 134 is formed by binding a plurality of porous honeycomb block bodies 132 via joining material layers A (133). The porous honeycomb block body 132 is formed by binding a plurality of porous honeycomb segments 130 via joining material layers B (131). FIG. 9 shows an embodiment where a total of four porous honeycomb block bodies 132 are bound by vertically and horizontally stacking two porous honeycomb block bodies 132, respectively, to join them, although not limited to thereto. For example, three or more porous honeycomb block bodies 132 may be vertically and horizontally stacked, respectively, to join them, and a different number of porous honeycomb block bodies may be vertically and horizontally stacked to join them, rather than the same number. Thus, the honeycomb structure 134 having a desired size can be appropriately produced using the porous honeycomb block bodies 132.

As with the structure shown in Embodiment 1 using FIG. 3, the porous honeycomb segment 130 includes: partition walls defining a plurality of cells to form flow paths for a fluid, which extends from an inflow end face that is an end face on a fluid inflow side to an outflow end face that is an end face on a fluid outflow side; and an outer peripheral wall located at the outermost periphery. The partition walls and the outer peripheral wall are preferably formed of porous bodies made of SiC (silicon carbide), although not limited thereto. They may be formed of cordierite, mullite, alumina, aluminum titanate, silicon nitride, and cordierite-silicon carbide composite material, lithium aluminum silicate, metallic silicon, or a mixture thereof.

Figure 10A:
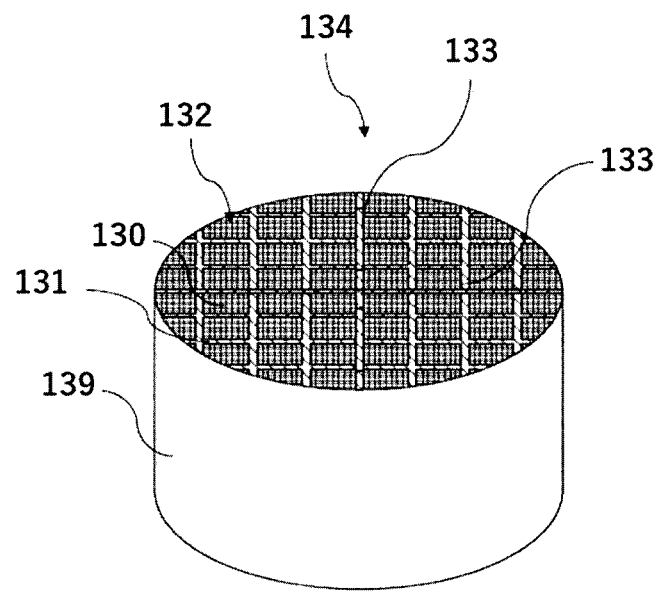
FIG. 10 (a) is a schematic external view of a honeycomb structure according to Embodiment 3 of the present invention in which an outer periphery is formed into a circular shape by grinding the outer periphery and then coating an outer peripheral surface with a coating material.
FIG. 10(b) is a cross-sectional view of a honeycomb structure according to Embodiment 3 of the present invention, which is perpendicular to a direction extending from an inflow end face to an outflow end face, in which an outer periphery is formed into a circular shape by grinding the outer periphery and then coating an outer peripheral surface with a coating material.
Figure 10B:
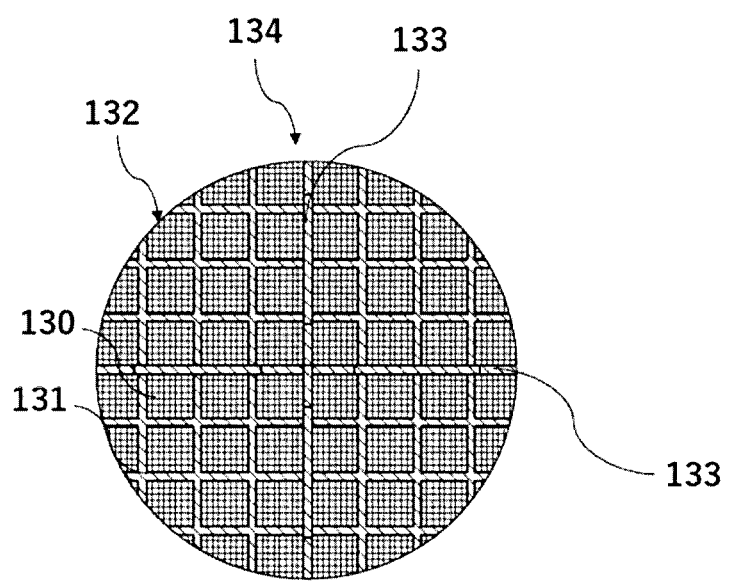

The honeycomb structure 134 according to Embodiment 3 of the present invention has a structure having plugged portions for purifying fine particles (carbon fine particles and the like) in an exhaust gas, so that it can be used as a fine particle collection filter such as a diesel engine particulate filter (DPF) and gasoline engine particulate filter (GPF). FIG. 10(*a*) shows a schematic external view of the honeycomb structure 134 in a state where the outer periphery is formed into a circular shape by grinding the outer periphery, and the outer peripheral surface is coated with a coating material 139. FIG. 10(*b*) shows a cross-sectional view of the honeycomb structure 134 perpendicular to a direction extending from the inflow end face to the outflow end face, in a state where the outer periphery is formed into a circular shape by grinding the outer periphery, and the outer peripheral surface is coated with the coating material 139.

The joining material layers A (133) for joining the plurality of porous honeycomb block bodies 132 is made of the same material as that of the joining material layers B (131) for joining the plurality of porous honeycomb segments 130, and are formed by joining material layers at least a part of which is lacked. In FIG. 9, as an example, the joining material having a predetermined width is provided on four sides on the side surface of the porous honeycomb block body 132 to form the joining material layers A (133) each having a rectangular cutout portion 136 in the center. Therefore, a thermal shock caused by uneven thermal expansion between the plurality of porous honeycomb block bodies 132 can be reduced. That is, even if a difference in thermal expansion occurs between the plurality of porous honeycomb block bodies 132, the joining material layers A (133) for joining the porous honeycomb block bodies 132 have the cutout portions 136, so that the cutout portions 136 can reduce the thermal expansion. Therefore, the joining material layers A (133) having the cutout portions 136 will absorb the difference in thermal expansion, and as a result, the thermal shock generated between the plurality of porous honeycomb block bodies 132 is reduced, so that the generation of cracks can be satisfactorily suppressed.

The size, depth, shape, position, and the like of the cutout portion 136 of the joining material layers A (133) are not particularly limited, and they may be set as needed depending on the size of the honeycomb structure 134, materials of the joining material layers A (133) and the joining material layers B (131) or the desired thermal shock resistance. Further, the cutout portions 136 may not be provided in all the joining material layers A (133) between the plurality of porous honeycomb block bodies 132, but they are preferably provided in a portion where cracks tend to occur due to thermal shock. For example, in a cross section of the honeycomb structure 134 in which the plurality of porous honeycomb block bodies 132 are vertically and horizontally stacked and joined, the joining material layers B (131) having the cutout portions 136 are preferably provided in a cross portion located at the vertical center and the horizontal center where cracks tend to occur. FIGS. 9 and 10 show the honeycomb structure 134 in which the joining material layer A (133) having the cutout portions 136 are located at such a cross portion. Further, the cutout portions 136 are preferably provided in all the joining material layers A (133) between the plurality of porous honeycomb block bodies 132 in order to improve the overall thermal shock resistance of the honeycomb structure 134. Furthermore, in order to improve the overall thermal shock resistance of the honeycomb structure 134, the cutout portions 136 are preferably provided in the same size, depth, shape and position in the joining material layers A (133) between the plurality of porous honeycomb block bodies 132. Moreover, it is preferable that the cutout portions 136 are provided at central portions of the joining material layers B (131).

The joining material layers A (133) and the joining material layers B (131) are not particularly limited as long as they can join the surfaces of the outer peripheral walls of the porous honeycomb segments 130 to each other with good adhesive strength. The joining material forming the joining material layers B (131) may contain, for example, inorganic particles, and inorganic fibers and colloidal oxides as other components. Further, during the joining of the porous honeycomb segments 130, in addition to those components, an organic binder such as methylcellulose and carboxymethylcellulose, a dispersant, water and the like may be optionally added, and mixed and kneaded using a kneader such as a mixer to form a paste, which may be used as a joining material.

Examples of materials for forming the inorganic particles contained in the joining materials forming the joining material layers A (133) and the joining material layers B (131) include ceramics selected from the group consisting of silicon carbide, silicon nitride, cordierite, alumina, mullite, zirconia, zirconium phosphate, aluminum titanate, titania, and combinations thereof; Fe—Cr—Al-based metals; nickel-based metals; silicon-silicon carbide-based composite materials; and the like.

Examples of the inorganic fibers contained in the joining materials forming the joining material layers A (133) and the joining material layers B (131) include ceramic fibers such as aluminosilicate and silicon carbide, and metal fibers such as copper and iron. Suitable colloidal oxides include silica sol, alumina sol and the like. The colloidal oxides are suitable for providing a suitable adhesive force to the joining material, and can also be bonded to the inorganic fibers and the inorganic particles by drying and degreasing them to provide a strong joining material having improved heat resistance after drying.

In the honeycomb structure 134 according to Embodiment 3 of the present invention, it is preferable that the plurality of the porous honeycomb block bodies 132 include the same number of porous honeycomb segments 130 as each other. Such a structure results in the plurality of porous honeycomb block bodies 132 having the same size, so that the widths of the joining material layers A (133) for joining the plurality of porous honeycomb block bodies 132 can be uniformly provided as a whole, thereby providing good thermal shock resistance. Further, since the porous honeycomb block bodies 132 having the same size may be produced, the production efficiency is improved.

In the honeycomb structure 134, the plurality of porous honeycomb block bodies 132 are formed by binding the same number of the porous honeycomb block bodies 132 in the vertical and horizontal directions. According to such a structure, when the outer periphery is ground and formed into a circular shape, the portion to be ground and removed is reduced, and the production efficiency is improved, as shown in FIG. 10.

As with the honeycomb structure 114 according to Embodiment 1, the honeycomb structure 134 according to Embodiment 3 may further include noble metal-based catalysts or catalysts other than these provided on the surfaces or inner sides of the partition walls that define a plurality of cells.

Method for Producing Honeycomb Structure 134

The method for producing the honeycomb structure 134 according to Embodiment 3 of the present invention can be carried out in the same manner as the method for producing the honeycomb structure 114 according to Embodiment 1. That is, first, the porous honeycomb segments 130 can be produced, and the joining material can be then applied to each of the plurality of porous honeycomb segments 130 between the joining surfaces to join them via the joining material layers B (131) to produce the porous honeycomb block body 132. The joining material can be then applied to each of a plurality of porous honeycomb block bodies 132 between the joining surfaces to join them via the joining material layer A (133) to produce the honeycomb structure 134 with the bound porous honeycomb block bodies 132 as shown in FIG. 9. In this case, the joining material layers A (133) for joining the plurality of the porous honeycomb block bodies are made of the same materials as that of the joining material layers B for joining the plurality of the honeycomb segments 130, and are formed by the joining material layers a part of which is lacked. That is, in Embodiment 3 of the present invention, at least a part of the joining material layers A (133) for joining the plurality of the porous honeycomb block bodies 132 has the cutout portion 136.

The honeycomb structure 134 thus formed has a structure having plugged portions for purifying fine particles (carbon fine particles and the like) in an exhaust gas, so that a fine particle collection filter such as a diesel engine particulate filter (DPF) and gasoline engine particulate filter (GPF) may be produced.

Further, in the step of producing the porous honeycomb block bodies 132, as shown in the method for producing the honeycomb structure 114 according to Embodiment 1 of the present invention, at least the outer peripheral wall of the porous honeycomb segment 130 forming the outer peripheral wall of the porous honeycomb block body 132 may be ground to be thicker by a grinding margin, and the grinding margin may be removed before joining them. Further, at least the outer peripheral wall of the porous honeycomb segment 130 forming the outer peripheral wall of the porous honeycomb block body 132 may be coated with the joining material and dried to form it to be thicker by the grinding margin, and the grinding margin may be removed before joining them.

DESCRIPTION OF REFERENCE NUMERALS

10, 110, 120, 130 porous honeycomb segment
20 adhesive layer
30 receiving plate
40, 112, 122, 132 porous honeycomb block body
111, 121, 131 joining material layer B
113, 123, 133 joining material layer A
114, 124, 134 honeycomb structure
115 cell
116 partition wall
117 outer peripheral wall
118 grinding margin
119, 129, 139 coating material 136 cutout portion
140 rotation axis
141 grindstone

What is claimed is:

1. A honeycomb structure comprising a plurality of porous honeycomb block bodies bound via joining material layers A,
    wherein each of the porous honeycomb block bodies comprises a plurality of porous honeycomb segments bound via joining material layers B, each of the porous honeycomb segments comprising: partition walls that defines a plurality of cells to form flow paths for a fluid, each of the cells extending from an inflow end face that is an end face on a fluid inflow side to an outflow end face that is an end face on a fluid outflow side; and an outer peripheral wall located at the outermost periphery,
    wherein the joining material layers (A) and the joining material layers (B) include alumina fibers, and the joining material layers (B) include a larger amount of alumina fibers than the joining material layers (A),
    wherein at least a part of the joining material layers A has higher toughness than that of the joining material layers B, and
    wherein the joining material layers (A) comprise joining material layers each having a width different from that of each of the joining material layers (B).

2. The honeycomb structure according to claim 1, wherein the joining material layers (A) having a higher toughness than that of the joining material layers (B) are made of the same components as that of the joining material layers (B).

3. The honeycomb structure according to claim 1, wherein the joining material layers (A) having a higher toughness than that of the joining material layers (B) are made of a material having a higher toughness than that of a material forming the joining material layers (B).

4. The honeycomb structure according to claim 1, wherein all of the joining material layers (A) have a higher toughness than that of the joining material layers (B).

5. A honeycomb structure comprising a plurality of porous honeycomb block bodies bound via joining material layers A,
    wherein each of the porous honeycomb block bodies comprises a plurality of porous honeycomb segments bound via joining material layers B, each of the porous honeycomb segments comprising: partition walls that defines a plurality of cells to form flow paths for a fluid, each of the cells extending from an inflow end face that is an end face on a fluid inflow side to an outflow end face that is an end face on a fluid outflow side; and an outer peripheral wall located at the outermost periphery,
    wherein the joining material layers A are formed of the same material as that of the joining material layers B, and the joining material layers A comprises joining material layers with at least a part of them including a cutout portion,
    wherein the joining material layers (A) comprise joining material layers each having a width different from that of each of the joining material layers (B), and
    wherein the cutout portion is surrounded on all sides by the joining material layers (A).

6. The honeycomb structure according to claim 1, wherein the plurality of porous honeycomb blocks have the same number of the porous honeycomb segments.

7. The honeycomb structure according to claim 1, wherein the honeycomb structure is formed by binding the same number of the porous honeycomb block bodies in a vertical direction and in a horizontal direction.

8. A method for producing a honeycomb structure, the method comprising the steps of:
    binding a plurality of porous honeycomb segments via joining material layers B to form porous honeycomb block bodies, each of the porous honeycomb segments comprising: partition walls that defines a plurality of cells to form flow paths for a fluid, each of the cells extending from an inflow end face that is an end face on a fluid inflow side to an outflow end face that is an end face on a fluid outflow side; and an outer peripheral wall located at the outermost periphery; and
    binding the porous honeycomb block bodies via joining material layers A to produce a honeycomb structure,
    wherein the joining material layers (A) and the joining material layers (B) include alumina fibers, and the joining material layers (B) include a larger amount of alumina fibers than the joining material layers (A),
    wherein at least a part of the joining material layers A has a higher toughness than that of the joining material layers B, and
    wherein the joining material layers (A) comprise joining material layers each having a width different from that of each of the joining material layers (B).

9. A method for producing a honeycomb structure, the method comprising the steps of:
    binding a plurality of porous honeycomb segments via joining material layers B to form porous honeycomb block bodies, each of the porous honeycomb segments comprising: partition walls that defines a plurality of cells to form flow paths for a fluid, each of the cells extending from an inflow end face that is an end face on a fluid inflow side to an outflow end face that is an end face on a fluid outflow side; and an outer peripheral wall located at the outermost periphery; and
    binding the porous honeycomb block bodies via joining material layers A to produce a honeycomb structure,
    wherein the joining material layers A are formed of the same material as that of the joining material layers B, and the joining material layers A comprise joining material layers with at least a part of them having a cutout portion,
    wherein the joining material layers (A) comprise joining material layers each having a width different from that of each of the joining material layers (B), and
    wherein the cutout portion is surrounded on all sides by the joining material layers (A).

10. The method according to claim 8, wherein the method comprises carrying out the step of binding the porous honeycomb block bodies via the joining material layers A to produce the honeycomb structure, after at least the outer peripheral wall of each of the porous honeycomb segments forming an outer peripheral wall of each of the porous honeycomb block bodies is formed to be thicker by a grinding margin, or the joining material is applied to at least the outer peripheral wall of each of the porous honeycomb segments forming the outer peripheral wall of each of the porous honeycomb block bodies and dried so as to have a thickness thicker by the grinding margin, in the step of producing the porous honeycomb block bodies, and then grinding and removing the grinding margin of the outer peripheral wall of each of the porous honeycomb segments forming the outer peripheral wall of each of the porous honeycomb block bodies.

* * * * *